United States Patent
Zhang et al.

(10) Patent No.: US 11,912,155 B2
(45) Date of Patent: Feb. 27, 2024

(54) BATTERY PACK LOCKING MECHANISM, BRACKET ASSEMBLY, ELECTRIC VEHICLE, AND BATTERY PACK LOCKING METHOD

(71) Applicants: AULTON NEW ENERGY AUTOMOTIVE TECHNOLOGY GROUP, Guangdong (CN); SHANGHAI DIANBA NEW ENERGY TECHNOLOGY CO., LTD., Shanghai (CN)

(72) Inventors: Jianping Zhang, Shanghai (CN); Chunhua Huang, Shanghai (CN)

(73) Assignees: AULTON NEW ENERGY AUTOMOTIVE TECHNOLOGY GROUP, Guangzhou (CN); SHANGHAI DIANBA NEW ENERGY TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 17/912,505

(22) PCT Filed: Mar. 17, 2021

(86) PCT No.: PCT/CN2021/081380
§ 371 (c)(1),
(2) Date: Sep. 17, 2022

(87) PCT Pub. No.: WO2021/185295
PCT Pub. Date: Sep. 23, 2021

(65) Prior Publication Data
US 2023/0191939 A1     Jun. 22, 2023

(30) Foreign Application Priority Data
Mar. 17, 2020 (CN) .......................... 202010188835.X

(51) Int. Cl.
*B60K 1/04* (2019.01)
*B60L 53/80* (2019.01)
*H01M 50/262* (2021.01)

(52) U.S. Cl.
CPC ............ *B60L 53/80* (2019.02); *H01M 50/262* (2021.01); *H01M 2220/20* (2013.01)

(58) Field of Classification Search
CPC ........ B60L 50/66; H01M 50/262; B60K 1/02; B60K 1/04
See application file for complete search history.

(56) References Cited

U.S. PATENT DOCUMENTS

| | | | | |
|---|---|---|---|---|
| 4,227,287 A * | 10/1980 | Gunther | .................. | F16B 21/04 411/350 |
| 6,267,543 B1 * | 7/2001 | David | ..................... | F16B 21/02 411/549 |

(Continued)

FOREIGN PATENT DOCUMENTS

| CN | 105109321 A | 12/2015 |
|---|---|---|
| CN | 205255985 U | 5/2016 |

(Continued)

OTHER PUBLICATIONS

Jun. 23, 2021 International Search Report issued in International Patent Application No. PCT/CN2021/081380.

(Continued)

*Primary Examiner* — Jason D Shanske
*Assistant Examiner* — James J Triggs

(57) ABSTRACT

A battery pack locking mechanism, used for unlocking or locking a battery pack on the bracket, and comprising a fixing portion. The fixing portion has a locking space. When the battery pack is placed relative to the bracket, the locking mechanism is used for locking a connecting portion on the battery pack in the locking space. On one side of the locking space, the locking mechanism is provided with an opening (Continued)

facing towards the battery pack and entering the bracket along the horizontal direction, so that the connecting portion enters the opening along the horizontal direction and moves into the locking space. According to the locking mechanism, effectively reducing the complexity of the process and the step of mounting and fixing the battery pack on the bracket. Also provided are a bracket assembly, an electric vehicle, and a battery pack locking method.

21 Claims, 12 Drawing Sheets

(56) References Cited

U.S. PATENT DOCUMENTS

| | | | | |
|---|---|---|---|---|
| 7,070,374 | B2* | 7/2006 | Womack | B60P 7/0815 |
| | | | | 410/104 |
| 8,164,300 | B2* | 4/2012 | Agassi | B60K 1/04 |
| | | | | 414/281 |
| 8,511,413 | B2* | 8/2013 | Ojima | B60L 50/66 |
| | | | | 180/68.5 |
| 8,657,545 | B2* | 2/2014 | Magno, Jr. | F16B 7/187 |
| | | | | 248/316.1 |
| 10,457,130 | B2* | 10/2019 | Bengtsson | B60L 50/66 |
| 2007/0108877 | A1* | 5/2007 | Bergmann | E05C 3/042 |
| | | | | 312/219 |
| 2009/0028660 | A1* | 1/2009 | Csik | F16B 5/0208 |
| | | | | 411/103 |
| 2013/0180791 | A1* | 7/2013 | Lejeune | B60K 1/04 |
| | | | | 180/68.5 |

FOREIGN PATENT DOCUMENTS

| | | |
|---|---|---|
| CN | 105857048 A | 8/2016 |
| CN | 108729760 A | 11/2018 |
| CN | 109987063 A | 7/2019 |
| CN | 110001372 A | 7/2019 |
| CN | 209320755 U | 8/2019 |
| CN | 209566780 U | 11/2019 |

OTHER PUBLICATIONS

Jun. 23, 2021 Written Opinion of the International Searching Authority issued in International Patent Application No. PCT/CN2021/081380.

Apr. 18, 2022 International Preliminary Report on Patentability issued in International Patent Application No. PCT/CN2021/081380.

* cited by examiner

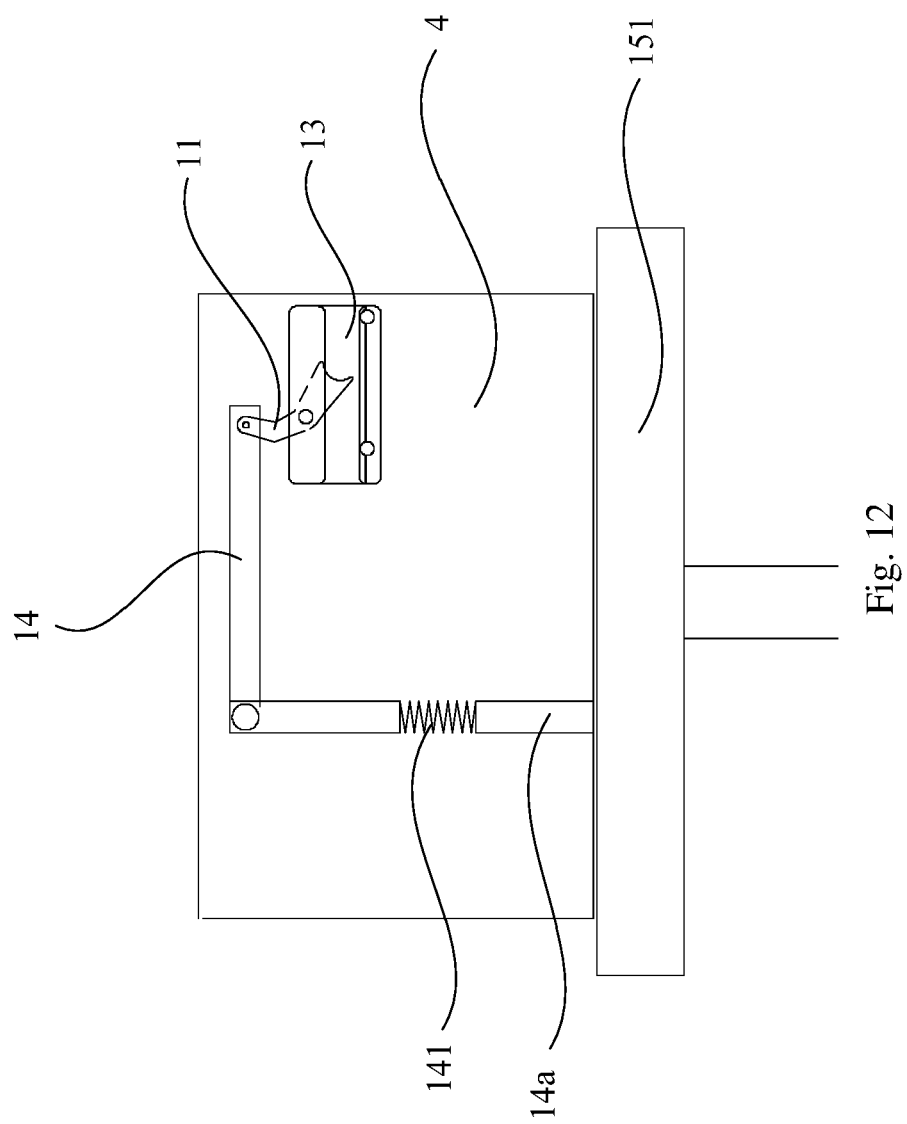

ptsw
BATTERY PACK LOCKING MECHANISM, BRACKET ASSEMBLY, ELECTRIC VEHICLE, AND BATTERY PACK LOCKING METHOD This application claims priority of Chinese patent application 202010188835X, filed on Mar. 17, 2020. The contents of the above Chinese patent application are incorporated herein by reference in their entirety.

FIELD OF INVENTION

The present invention relates to a battery pack locking mechanism, a bracket assembly, an electric vehicle and a battery pack locking method.

PRIOR ARTS

The battery installation methods of existing electric vehicles are generally divided into fixed type and exchangeable type, wherein, the fixed battery is generally fixed on the vehicle, and the vehicle is directly used as a charging object when charging. However, the exchangeable battery is generally fixed on a bracket of the vehicle by means of movable installation, wherein the battery can be removed for replacement or charging separately and can be installed on the vehicle again after the replaced battery is charged.

In the prior art, replacement methods of the battery include manual, automatic and other means, and when the battery is installed on the bracket of the vehicle, the bracket needs to lock the battery on the bracket no matter which means is used, it is usually realized by multi-point locking because of the large volume and heavy weight of the battery, thus, for the locking mechanism, how to quickly and conveniently lock or unlock the battery on the vehicle bracket is the focus of research and development by existing technicians. CN109987063U discloses a battery swapping device for horizontally loading and unloading batteries, which is used to load a battery box into a battery compartment, or take out a battery box from a battery compartment, wherein the battery compartment is provided with a locking groove, and the battery box is provided with a locking bolt; when the battery box is installed in the battery compartment, the locking bolt can be locked in the locking groove. The cooperation of the locking bolt and the locking groove makes the battery box locked in the battery compartment to prevent the battery box from leaving the battery compartment. CN108729760A discloses a locking device and an AGV using the device, which includes a fixing frame, wherein the fixing frame is rotatably fitted with a locking catch, on which a bearing portion is provided for being driven by the locked portion to rotate forward around the rotating shaft of the locking catch when the locked portion moves toward the locking catch, and a locking arm extending radially along the rotating shaft is also provided, wherein the locking arm rotates when the locking catch rotates in the forward direction and blocks the locking lug on the locked portion in the direction away from the locking catch, and the locking device further comprises a stopper that cooperates with the locking catch to stop the locking lug from rotating in the reverse direction after the locking lug is stopped, wherein the stopper is connected with an electrically controlled drive unit and driven by the drive unit to block and unblock the locking catch, wherein the fixing frame is also provided with an elastomer connected with the locking catch, and the elastomer provides elastic force for the locking catch to rotate in the reverse direction and drives the locking catch to rotate in the reverse direction after the stopper shall the unblock the locking catch, so as to release the locking lug. All of the above locking structures have complex structures, the locking and unlocking processes are cumbersome, and both locking stability and efficiency of locking and unlocking cannot be considered.

CONTENT OF THE PRESENT INVENTION

The technical problem to be solved in the present invention is to improve the locking stability while taking into account the efficiency of locking and unlocking, and overcome the defects of the complicated process and cumbersome steps of installing the battery pack on the bracket in the prior art, hence providing a battery pack locking mechanism, a bracket assembly, an electric vehicle and a battery pack locking method.

The present invention solves the technical problem by the following technical solutions:

A battery pack locking mechanism, provided on a side wall of a bracket, wherein the locking mechanism is used for unlocking or locking a battery pack on the bracket, and comprising a fixing portion which has a locking space, and when the battery pack is placed relative to the bracket, the locking mechanism is used for locking a connecting portion on the battery pack in the locking space;

on one side of the locking space, the locking mechanism is provided with an opening facing towards the battery pack and entering the bracket along the horizontal direction, so that the connecting portion can enter the opening along the horizontal direction and move into the locking space.

According to the locking mechanism, the connecting portion of the battery pack is enabled to enter the locking space by means of the opening along the horizontal direction, and the locking space is used to fix the connecting portion, so that the purpose of fixing the battery pack relative to the bracket by means of the displacement in the horizontal direction is achieved, and realizes the operation of locking the battery pack during the process of moving the battery pack into the bracket along the horizontal direction, without additional locking operation, so that on the one hand, the stable locking of the battery pack on the bracket is realized, on the other hand, the locking operation of the battery pack is simplified, and the locking efficiency is improved, thereby effectively reducing the complexity of the process and the step of mounting and fixing the battery pack on the bracket.

Preferably, the locking mechanism further comprises a locking bolt, which is used to lock the connecting portion to prevent the connecting portion from leaving the locking space after the connecting portion on the battery pack enters the locking space, so as to avoid the risk of the battery pack coming out of the bracket after the locking is completed.

The connecting portion on the battery pack is prevented from leaving the locking space on the bracket by the locking bolt, which realizes the stable locking of the battery pack and improves the safety of the battery pack in electric vehicles.

Preferably, the locking bolt is rotatably arranged on the bracket to open or close the opening, and the locking bolt can be switched between a first state position and a second state position;

when the locking bolt is in the first state position, the locking bolt opens the opening, and the connecting portion can enter or leave the locking space;

when the locking bolt is in the second state position, the locking bolt closes the opening, and the connecting portion cannot enter or leave the locking space.

With the above structural arrangement, the opening and closing of the locking space can be realized by switching between the first state position and the second state position with the locking bolt, which simplifies the locking and unlocking operations, improves the efficiency of locking and unlocking, and realizes the purpose of efficiently unlocking or locking the battery pack on the bracket.

Preferably, the locking bolt is provided on the bracket by means of a rotating shaft, the rotating shaft is provided on the bracket above the locking space, and the rotating shaft is arranged such that when the connecting portion is located in the locking space, the horizontal distance between the axis of the rotating shaft and a front surface of the battery pack is greater than the horizontal distance between the center of the connecting portion and the front surface of the battery pack.

With the structural arrangement of the above rotating shaft, when the connecting portion is in the locking space, even if the battery pack shakes on the bracket and causes the connecting portion on the battery pack to squeeze or hit the locking bolt, the locking bolt cannot be switched to the first state position by a acting force acting on the locking bolt by the connecting portion itself, so that the locking bolt opens the opening and leads to locking failure. Therefore, when the connecting portion is in the locking space, the arrangement of the above described rotating shaft makes the locking bolt have a self-locking effect on the connecting portion, so as to effectively improve the reliability of the battery pack locking mechanism.

Preferably, the fixing portion is provided with a channel leading to the opening, and the channel is used for the connecting portion to enter the opening.

With the above structural arrangement, the connecting portion can be guided to enter the opening accurately.

Preferably, when the battery pack is locked relative to the bracket, the locking mechanism applies a vertical support force and a horizontal abutting force to the battery pack.

The connecting portion and the connected battery pack can be vertically carried and received and horizontally locked by the locking mechanism, and the locking stability of the locking mechanism to the battery pack is improved.

Preferably, the fixing portion comprises a locking body, and one side of the locking body has a locking groove concave to the inside of the locking body, wherein the locking space is formed in the locking groove, and the locking groove forms the opening on the surface of the locking body, and the opening is used for allowing the connecting portion to enter and exit the locking space along the direction of the battery pack being electrically inserted and unplugged relative to the bracket.

So that the battery pack can be locked relative to the locking mechanism at the same time when it is electrically plug-in the bracket, which further simplifies the complexity of the process of locking the battery pack on the bracket and improves the locking efficiency.

Preferably, when the battery pack enters the bracket, the locking bolt rotates toward the direction close to an electrically plug-in surface of the bracket to open the opening;
when the battery pack reaches the locking space, the locking bolt rotates in a direction away from an electrically inserted and unplugged surface of the bracket to close the opening.

In the process of electrically plug-in of the battery pack relative to the bracket, the opening is opened and the battery pack is locked at the same time, which improves the locking efficiency.

Preferably, the fixing portion further comprises a driver which is connected to the locking bolt, and the driver is used to drive the locking bolt to switch from the second state position to the first state position, so as to unlock the battery pack.

The driver drives the locking bolt to switch from the second state position to the first state position to realize the quick unlocking of the battery pack.

Preferably, the locking bolt is in the second state position when it is located at the opening of the locking groove, and the connecting portion can push the locking bolt to move from the second state position to the first state position.

With the above structural arrangement, the locking bolt is pushed to rotate and the opening is opened by the force generated by the horizontal movement of the battery pack to the bracket.

The position of the locking bolt is switched through the connecting portion of the battery pack itself to open the opening, so that the battery pack can enter the locking space quickly and stably.

Preferably, the direction in which the connecting portion pushes the locking bolt to move from the second state position to the first state position is the same as the direction in which the connecting portion enters the locking space through the opening.

With the above structural arrangement, the purpose that the connecting portion can horizontally push the locking bolt to rotate and open the opening is achieved.

Preferably, when the battery pack is electrically plug-in the bracket, the connecting portion is located in the locking space.

While the battery pack is electrically plug-in the bracket, the relative locking between the battery pack and the bracket is also realized.

Preferably, the fixing portion further comprises a limiting member, which is used to limit the locking bolt from moving away from the second state position when the locking bolt is in the first state position;
when the battery pack is electrically plug-in the bracket, the locking bolt is located at the second state position, and the connecting portion abuts on the surface of the locking bolt in a direction that pushes the locking bolt away from the second state position.

When the connecting portion exerts an outward force on the locking bolt in the locking space, it is ensured that the locking bolt effectively and reliably locks the connecting portion in the locking space.

Preferably, the locking bolt has an arc-shaped abutting surface, which is used for abutting with the connecting portion.

The contact area between the connecting portion and the locking bolt is increased during the abutting process, so that the force exerted by the connecting portion on the locking bolt can be transmitted in the correct direction, and the stability of the locking or unlocking process is improved to ensure that the locking bolt can lock the connecting portion in the locking space.

Preferably, one side surface of the locking groove has a locking bolt groove which is used to accommodate the locking bolt, and the locking bolt is in the first state position when it is located in the locking bolt groove.

With the above structural arrangement, the connecting portion can enter the locking space along the locking groove.

Preferably, the fixing portion further comprises an elastomer, which is used to apply an elastic force to the locking bolt to keep the locking bolt in the second state position when it is not affected by an external force.

With the above structural arrangement, after the connecting portion enters the locking space, the locking bolt is driven to return to the second state position by the elastic force of the elastomer to close the opening.

Preferably, the elastomer is a compression spring.

With the above structural arrangement, the rebound effect of the locking bolt can be improved.

Preferably, the fixing portion further comprises a connecting rod, which is movably connected to the locking bolt, and the connecting rod drives the locking bolt to move from the second state position to the first state position under the action of an external force.

With the above structural arrangement, the purpose of unlocking the battery pack relative to the bracket is achieved.

Preferably, the fixing portion further comprises a driver, which is used to drive the connecting rod to drive the locking bolt to move from the second state position to the first state position, so as to control the movement of the locking bolt to unlock the battery pack to the bracket.

Through the driver, the locking bolt is driven to switch from the locked state to the unlocked state, which improves the efficiency of automatic unlocking.

Preferably, a tail end of the connecting rod protrudes downward from the lower surface of the bracket, and the driver is a lift or a stacker, wherein the driver is located below the bracket, and a lifting platform of the driver lifts up and pushes the tail end of the connecting rod to drive the locking bolt to move from the second state position to the first state position.

With the above structural arrangement, the lift or the stacker in the existing battery swapping device is used to both transfer and unlock the battery, so as to further simplify the complexity of the unlocking process of the battery pack locking mechanism and improve the unlocking efficiency.

Preferably, the lifting platform of the driver contacts the lower surface of the bracket after pushing the tail end of the connecting rod upward.

So as to further realize the purpose of lifting the bracket and improve the versatility of each component.

Preferably, the connecting rod can be compressed along the transmission direction of the external force.

With the above structural arrangement, the force is stored when the locking bolt cannot be switched to the first state, and released when the locking bolt can be switched to the first state, so as to drive the locking bolt to move to the first state and achieve the purpose of unlocking.

Preferably, the movable mode of the locking bolt relative to the bracket is a turning activity, and the locking bolt switches between the first state position and the second state position by the turning activity.

The above structural arrangement provides a better way to switch the position of the locking bolt between the first state position and the second state position.

A battery pack locking mechanism which is used for unlocking or locking a battery pack on a bracket, wherein the locking mechanism comprising a fixing portion respectively provided on a side wall of the bracket and a connecting portion provided at a corresponding position of the battery pack, and the fixing portion has a locking space, wherein the locking mechanism is used to lock the connecting portion in the locking space when the battery pack is placed relative to the bracket;

on one side of the locking space, the locking mechanism is provided with an opening facing towards the battery pack and entering the bracket along the horizontal direction, so that the connecting portion can enter the opening along the horizontal direction and move into the locking space.

According to the locking mechanism, the connecting portion of the battery pack is enabled to enter the locking space by means of the opening along the horizontal direction, and the locking space is used to fix the connecting portion, so that the purpose of fixing the battery pack relative to the bracket by means of the displacement in the horizontal direction is achieved, thereby effectively reducing the complexity of the process and the step of mounting and fixing the battery pack on the bracket.

Preferably, the fixing portion comprises a locking body, and one side of the locking body has a locking groove concave to the inside of the locking body, wherein the locking space is formed in the locking groove, and the locking groove forms the opening on the surface of the locking body, and the opening is used for allowing the connecting portion to enter and exit the locking space along the direction of the battery pack being electrically inserted and unplugged relative to the bracket, so that the battery pack can be locked relative to the locking mechanism at the same time when it is electrically plug-in the bracket, which further simplifies the complexity of the process of locking the battery pack on the bracket.

Preferably, the connecting portion is a protruding structure formed on a surface of a shell of the battery pack, so as to lock the fixing portion with the protruding structure of the surface of the shell of the battery pack, which can effectively improve the locking strength.

Preferably, the connecting portion is a cylindrical protruding mechanism, and the shape of the groove end of the locking groove is adapted to the shape of the connecting portion to further improve the locking effect.

A bracket assembly which includes a bracket and the battery pack locking mechanism as described above.

According to the locking mechanism of the bracket assembly, the connecting portion of the battery pack is enabled to enter the locking space by means of the opening along the horizontal direction, and the locking space is used to fix the connecting portion, so that the purpose of fixing the battery pack relative to the bracket by means of the displacement in the horizontal direction is achieved, thereby effectively reducing the complexity of the process and the step of mounting and fixing the battery pack on the bracket.

Preferably, it has a plurality of locking mechanisms, and a plurality of the locking mechanisms are arranged in sequence along the direction in which the battery pack enters and exits relative to the bracket, so as to improve the fixing ability of the locking mechanism to the battery pack.

Preferably, the battery pack is electrically inserted and unplugged relative to the bracket along a horizontal direction, and the direction in which the battery pack enters and exits relative to the bracket is the same as the direction in which the battery pack is electrically inserted and unplugged relative to the bracket.

With the above structural arrangement, the battery pack can be locked relative to the locking mechanism at the same time when it is electrically plug-in the bracket, which further simplifies the complexity of the process of locking the battery pack on the bracket.

Preferably, a plurality of the locking mechanisms are distributed on both side surfaces of the battery pack, so as to arrange the locking mechanisms by using the longitudinal space on both sides of the bracket, and make a reasonable layout.

Preferably, the bracket is fixed to a surface of a chassis beam of the electric vehicle through fasteners, so that the bracket assembly can maintain stability when installed in the electric vehicle.

An electric vehicle which includes the bracket assembly as described above.

In the electric vehicle, according to the locking mechanism of the bracket assembly, the connecting portion of the battery pack is enabled to enter the locking space by means of the opening along the horizontal direction, and the locking space is used to fix the connecting portion, so that the purpose of fixing the battery pack relative to the bracket by means of the displacement in the horizontal direction is achieved, thereby effectively reducing the complexity of the process and the step of mounting and fixing the battery pack on the bracket.

Preferably, the bracket of the bracket assembly is fixed to the surface of the chassis beam of the electric vehicle through fasteners.

With the above structural arrangement, the bracket assembly can maintain stability when installed in the electric vehicle, and the vibration of the bracket assembly when the electric vehicle is running can be avoided.

Preferably, the chassis of the electric vehicle has a left beam and a right beam arranged in parallel;

the bracket assembly is arranged on the left beam and the right beam.

With the above structural arrangement, the mounting stability of the bracket assembly can be further improved.

Preferably, a bottom plate crossbeam of the bracket of the bracket assembly is integrally formed, and the bottom plate crossbeam is fixed to lower side surfaces of the left beam and the right beam to further improve the mounting stability of the bracket assembly.

A battery pack locking method which uses the battery pack locking mechanism as described above.

The battery pack is locked on the bracket by moving the battery pack horizontally into the opening and then horizontally into the locking space.

The positive improved effects of this invention are:

According to the locking mechanism, the connecting portion of the battery pack is enabled to enter the locking space by means of the opening along the horizontal direction, and the locking space is used to fix the connecting portion, so that the purpose of fixing the battery pack relative to the bracket by means of the displacement in the horizontal direction is achieved, thereby effectively reducing the complexity of the process and the step of mounting and fixing the battery pack on the bracket.

BRIEF DESCRIPTION OF THE DRAWINGS

FIG. 12 is a schematic view (2) of the motion state of the connecting rod in the embodiment 2 of the present invention.

Figure 1:
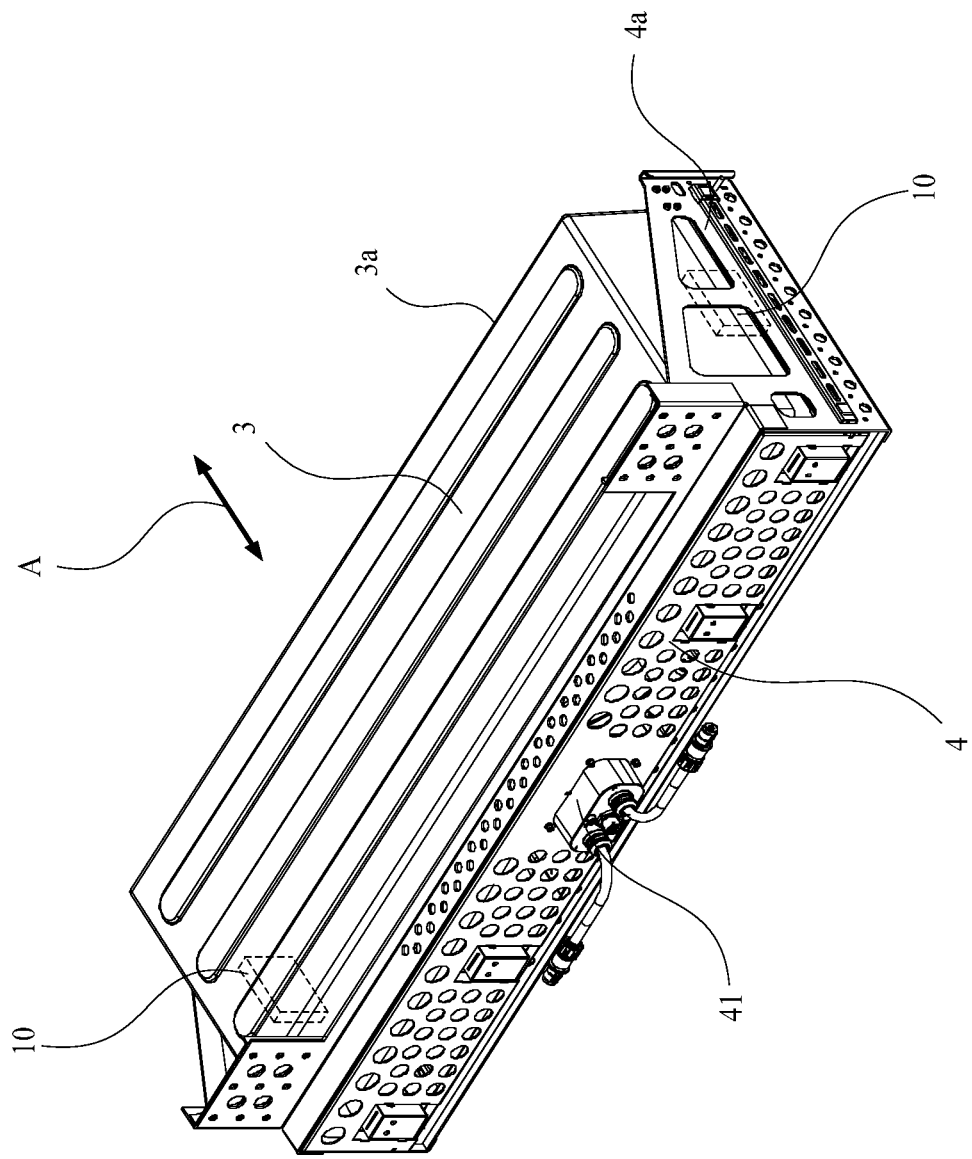
FIG. 1 is a schematic view of the bracket assembly in the embodiment 1 of the present invention.

DESCRIPTION OF REFERENCE NUMERALS locking mechanism 10, horizontal direction A; locking space 1a, opening 1b, channel 1c; locking bolt 11, abutting surface 111; rotating shaft 12; locking body 13, locking groove 131, locking bolt groove 132, mounting hole 133; connecting rod 14, tail end 14a, compression spring 141; lifting platform 151; limiting structure 161; connecting portion 2; battery pack 3, front surface 3a; bracket 4, side wall 4a, lower surface 4b; electrical connection plug 41; bracket assembly 20; electric vehicle body 5, left beam 51, right beam 52

DETAILED DESCRIPTION OF THE PREFERRED EMBODIMENT

The following embodiments further illustrate the present invention, but the present invention is not limited by the following embodiments thereto.

Embodiment 1

Figure 2:
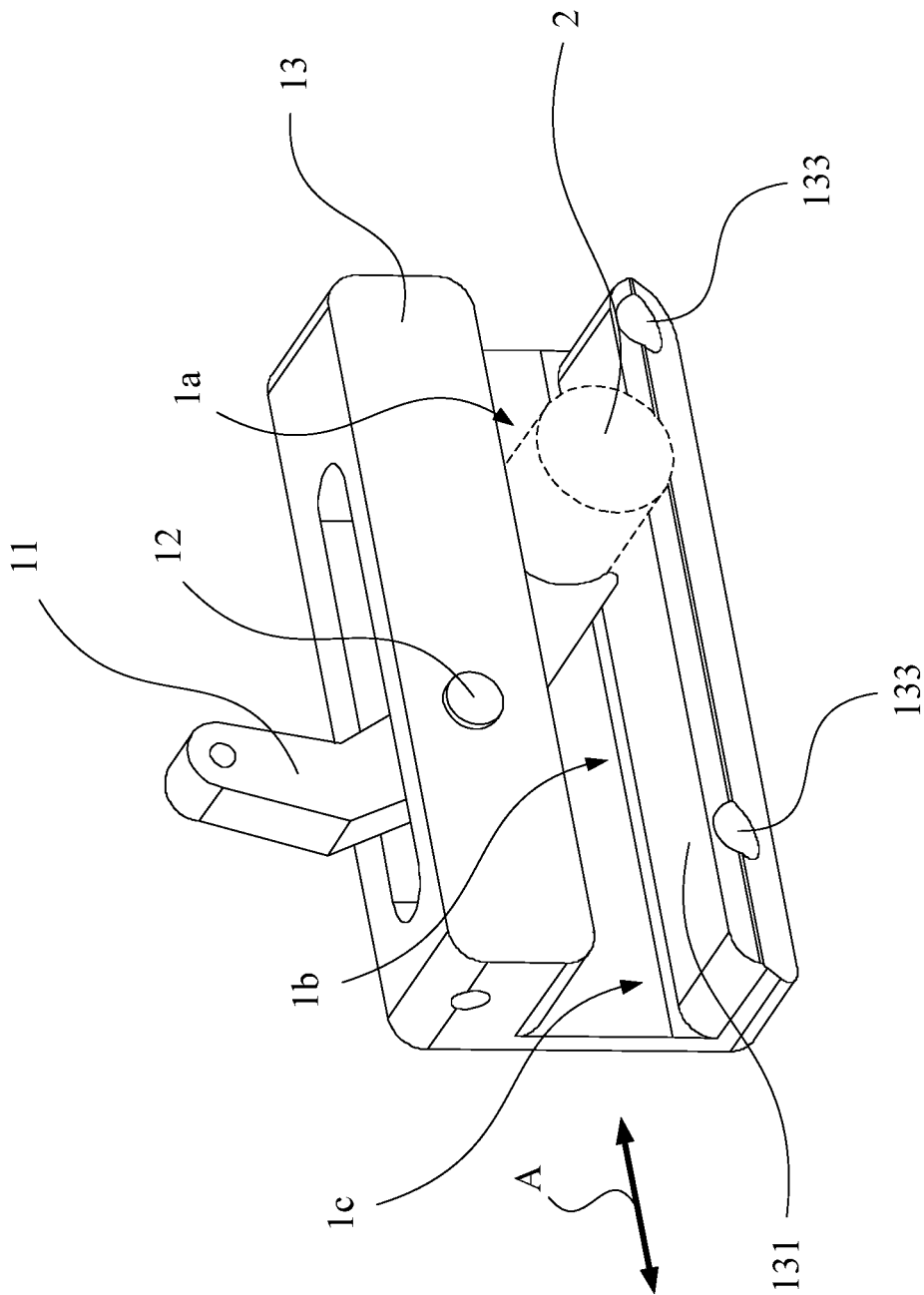
FIG. 2 is a schematic view of the locking mechanism in the embodiment 1 of the present invention.

As shown in FIG. 1 and FIG. 2, the present invention provides a battery pack 3 locking mechanism 10, which is provided on a side wall 4a of a bracket 4, and the locking mechanism 10 is used for unlocking or locking a battery pack 3 on the bracket 4 and comprising a fixing portion which has a locking space 1a, and when the battery pack 3 is placed relative to the bracket 4, the locking mechanism 10 is used for locking a connecting portion 2 on the battery pack 3 in the locking space 1a. On one side of the locking space 1a, the locking mechanism 10 is provided with an opening 1b facing towards the battery pack 3 and entering the bracket 4 along the horizontal direction A, so that the connecting portion 2 on the battery pack 3 can enter the opening 1b along the horizontal direction A and continue to move along the horizontal direction A to move into the locking space 1a, so as to achieve the purpose of locking the battery pack 3 relative to the bracket 4.

According to the locking mechanism 10, the connecting portion 2 of the battery pack 3 is enabled to enter the locking space 1a by means of the opening 1b along the horizontal direction A, and the locking space 1a is used to fix the connecting portion 2, so that the purpose of fixing the battery pack 3 relative to the bracket 4 by means of the displacement in the horizontal direction A is achieved, and realizes the operation of locking the battery pack 3 during the process of moving the battery pack 3 into the bracket 4 along the horizontal direction A, without additional locking operation, so that on the one hand, the stable locking of the battery pack 3 on the bracket 4 is realized, on the other hand, the locking operation of the battery pack 3 is simplified, and the locking efficiency is improved, thereby effectively reducing the complexity of the process and the step of mounting and fixing the battery pack 3 on the bracket 4.

In the embodiment, as shown in FIG. 1, two locking mechanisms 10 are respectively installed at the positions of the side walls 4a on both sides of the bracket 4, and the end plates of the bracket 4 are provided with electrical connection plugs 41 to realize the purpose of electrical connection by plugging into the electrical connection sockets on the battery pack 3, wherein the end plates are connected between the side walls on both sides. The connecting portion 2 is a protruding structure formed on a surface of a shell of the battery pack 3, so as to lock the fixing portion with the protruding structure of the surface of the shell of the battery pack 3, which can effectively improve the locking strength. Concretely, the connecting portion 2 may be integrally formed with the shell of the battery pack 3, or may be fixedly connected to the shell of the battery pack 3, wherein the connecting portion 2 can be rod-shaped, plate-shaped or block-shaped, etc, and may enter the locking space 1a to lock the battery pack 3 relative to the bracket 4.

As shown in FIG. 2, it is a schematic view of the battery pack 3 locking mechanism 10 in the embodiment, and it can be seen from the view that the fixing portion of the lock mechanism includes a locking bolt 11 and a locking body 13, wherein the locking body 13 is fixed to the side wall 4a of the bracket 4 through a mounting hole 133 on the surface, and one the side of the locking body 13 facing the battery pack 3 has a locking groove 131 concave to the inside of the locking body 13, wherein the locking groove 131 extends in the direction of the battery pack 3 entering and leaving the bracket 4, and the above-mentioned locking space 1a is formed in this locking groove 131, and the locking groove 131 forms the opening 1b on the surface of the locking body 13, wherein the opening 1b is used for allowing the connecting portion 2 to enter and exit the locking space 1a along the direction of the battery pack 3 being electrically inserted and unplugged relative to the bracket 4, so that the battery pack 3 can be locked relative to the locking mechanism 10 at the same time when it is electrically plug-in the bracket 4, which further simplifies the complexity of the process of locking the battery pack 3 on the bracket 4 and improves the locking efficiency. In addition, the connecting portion 2 in the embodiment is specifically cylindrical in shape, so as to adapt to the shape of the groove end of the locking groove 131 and improve the fixing effect. In the embodiment, the locking body 13 is fixed to the side wall 4a of the bracket 4 by fasteners, while in other embodiments, the locking body 13 may be directly formed on the side wall 4a of the bracket 4, that is, the locking groove 131 of the locking body 13 is opened in the side wall 4a of the bracket 4, so that the locking space 1a is also located in the bracket 4, so as to achieve the same effect as in the embodiment.

The locking bolt 11 is used to lock the connecting portion 2 to prevent the connecting portion 2 from leaving the locking space 1a after the connecting portion 2 formed on the shell surface of the battery pack 3 enters the locking space 1a, so as to avoid the risk of the battery pack 3 coming out of the bracket 4 after the locking is completed. The connecting portion 2 on the battery pack 3 is prevented from leaving the locking space 1a on the bracket 4 by the locking bolt 11, which realizes the stable locking of the battery pack 3 and improves the safety of the battery pack 3 in electric vehicles.

Concretely, the locking bolt 11 is connected to the locking body 13 by means of a rotating shaft 12, wherein the locking bolt 11 opens or closes the opening 1b by turning over, and the locking bolt 11 can be switched between the first state position and the second state position. When the locking bolt 11 is in the first state position, the locking bolt 11 can open the opening 1b, so that the connecting portion 2 can enter or leave the locking space 1a, that is, the battery pack 3 can enter or be removed from the bracket 4; when the locking bolt 11 is in the second state position, the locking bolt 11 can close the opening 1b, and the connecting portion 2 cannot enter or leave the locking space 1b, that is, the battery pack 3 is locked to the bracket 4. With the above structure, the opening and closing of the locking space 1a can be realized by switching between the first state position and the second state position with the locking bolt 11, which simplifies the locking and unlocking operations, improves the efficiency of locking and unlocking, and realizes the purpose of efficiently unlocking or locking the battery pack 3 on the bracket.

Figure 5:
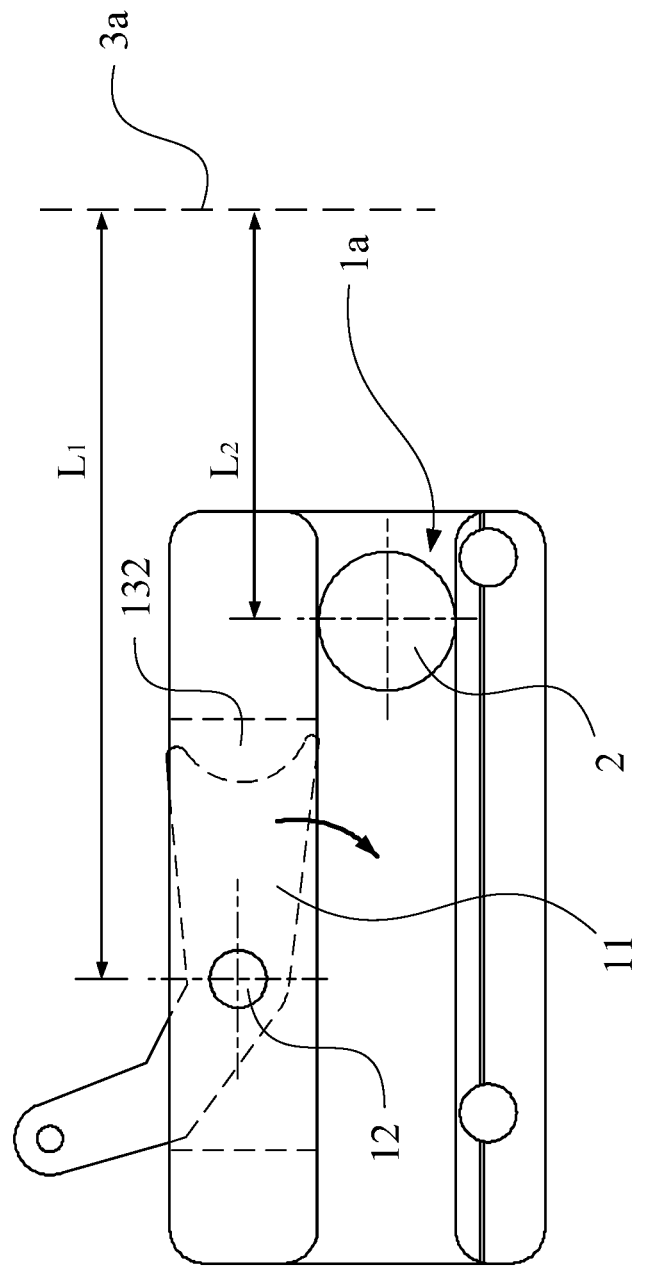
FIG. 5 is a flowchart (3) of the locking process of the locking mechanism in the embodiment 1 of the present invention.

Wherein, as shown in FIG. 5, the connecting portion 2 is locked in the locking space 1a. The rotating shaft 12 is provided at a position above the locking space 1a, and the position of the rotating shaft 12 is specifically arranged such that when the connecting portion 2 is located in the locking space 1a, the horizontal distance L1 between the axis of the rotating shaft 12 and a front surface 3a (as shown in FIG. 1) of the battery pack 3 is greater than the horizontal distance L2 between the center of the connecting portion 2 and the front surface 3a of the battery pack 3. With this position arrangement, when the battery pack 3 is separated from the bracket 4 along the horizontal direction A by an external force, and the locking bolt 11 is in the second state position, even if the connecting portion 2 abuts on the locking bolt 11 along the direction of horizontally away from the bracket 4, most of the component force of the force generated by the connecting portion 2 on the locking bolt 11 will pass through the rotating shaft 12, and the locking bolt 11 cannot be pushed to the first state position. That is, with the arrangement of the above rotating shaft 12, when the connecting portion 2 is in the locking space 1a, even if the battery pack 3 shakes on the bracket 4 and causes the connecting portion 2 on the battery pack 3 to squeeze or hit the locking bolt 11, the locking bolt 11 cannot be switched to the first state position by a acting force acting on the locking bolt 11 by the connecting portion 2 itself, so that the locking bolt 11 opens the opening 1b and leads to locking failure. Therefore, when the connecting portion 2 is in the locking space 1a, the arrangement of the above described rotating shaft 12 makes the locking bolt 11 have a self-locking effect on the connecting portion 2, so as to effectively improve the reliability of the battery pack 3 locking mechanism 10.

In addition, a channel 1c with an opening 1b is provided on one side surface of the locking body 13, wherein the channel 1c is used to guide the connecting portion 2 to enter the opening 1b along the horizontal direction A, therefore, a guide surface is provided at the entrance of the channel 1c to guide the connecting portion 2 into the channel 1c, wherein the guide surface is a slope or an arc to guide the connecting portion 2 to enter the opening 1b accurately.

Figure 3:
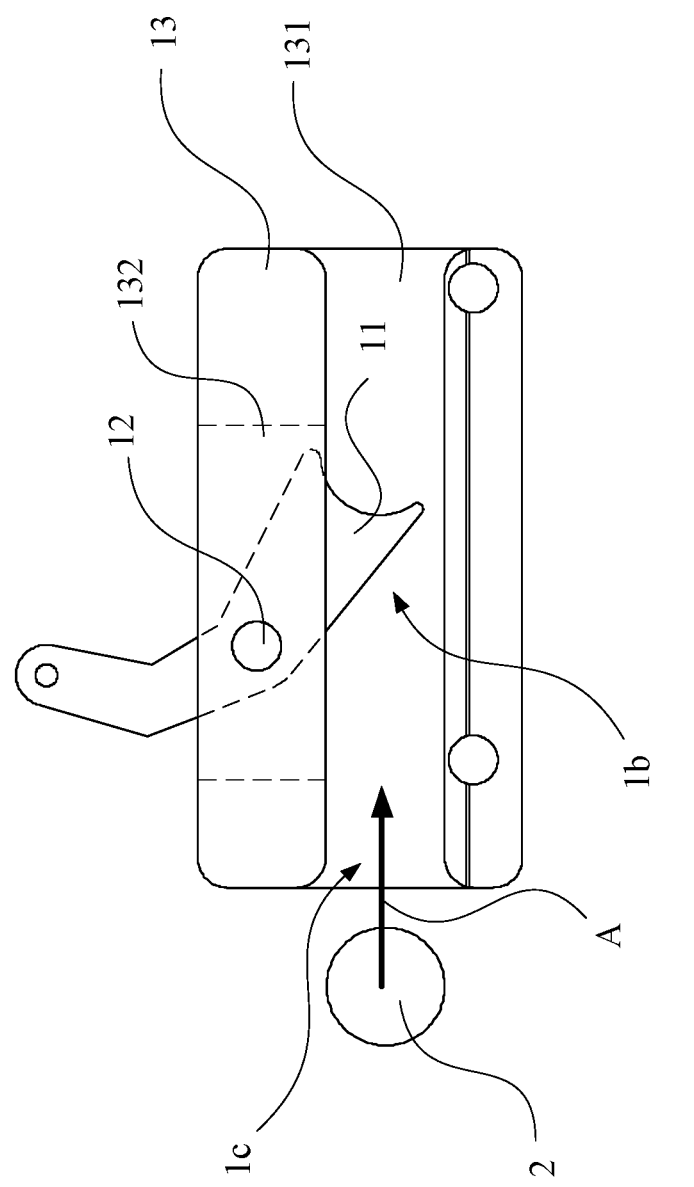
FIG. 3 is a flowchart (1) of the locking process of the locking mechanism in the embodiment 1 of the present invention.
Figure 4:
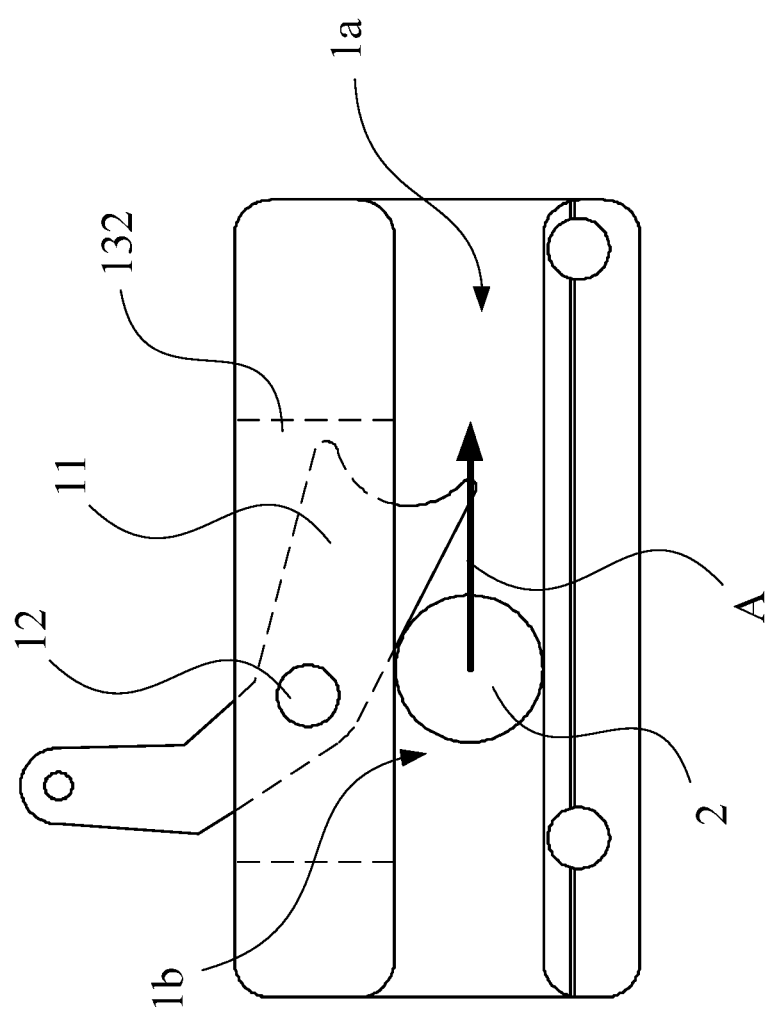
FIG. 4 is a flowchart (2) of the locking process of the locking mechanism in the embodiment 1 of the present invention.

In the embodiment, as shown in FIG. 3-FIG. 5, this is the process of switching the position of the locking bolt 11 when the battery pack 3 enters the bracket 4. As shown in FIG. 3, when the battery pack 3 enters the bracket 4, the connecting portion 2 enters the locking body 13 from the channel 1*c* and moves to the opening 1*b*, at this time, the locking bolt 11 is in the second state position, and the connecting portion 2 is in contact with the surface of the locking bolt 11.

As shown in FIG. 4, since the direction in which the locking bolt 11 moves from the second state position to the first state position is the same as the direction in which the connecting portion 2 enters the locking space 1*a* through the opening 1*b*, as a result, the locking bolt 11 is pushed by the connecting portion 2 to rotate in the direction close to the end plate of the bracket 4 (that is, the surface of the bracket 4 where the electrical connection plug 41 is arranged), so as to turn upward and switch to the first state position to open the opening 1*b*, so that the connecting portion 2 can continue to move horizontally to enter the locking space 1*a*. The force exerted by the electrical connection plug 41 on the bracket 4 on the electrical connection socket on the battery pack 3 restricts the connection portion 2 from moving further along the horizontal direction A toward the end plate of the bracket 4, and then, as shown in FIG. 5, after the battery pack 3 has completely entered the locking space 1*a*, the locking bolt 11 rotates in a direction away from the electrical plug-in surface of the bracket 4, so as to realize the downward turning and return to the second state position to close the opening 1*b*, so that the connecting portion 2 can no longer leave the locking body 13 from the opening 1*b*. In the process of electrically plug-in of the battery pack 3 relative to the bracket 4, the opening is opened and the battery pack 3 is locked at the same time, which improves the locking efficiency.

Wherein, as shown in FIG. 5, the locking bolt 11 is turned over by the rotating shaft 12, and when the weight of the lower end of the locking bolt 11 is heavier than the weight of the upper end, the locking bolt 11 can turn down under the action of gravity and return to the second state position. Of course, in other embodiments, the locking bolt 11 may also be connected to an elastic member (not shown in the figures) such as a compression spring, so as to drive the locking bolt 11 to return to the second state position by the elastic force of the elastic member. Or the locking bolt 11 is controlled to rotate between the first state position and the second state position by an external force acting on the locking bolt 11.

While the connecting portion 2 is located in the locking space 1*a*, the battery pack 3 is also electrically connected with the bracket 4, so as to realize the physical and electrical connection of the battery pack 3 with the bracket 4 at the same time, so that the battery pack 3 and the bracket 4 can be relatively locked.

When the battery pack 3 is pushed to the electrical connection plug 41 on the bracket 4 along the horizontal direction A to achieve electrical connection, it is in the first locking position (that is, the position where the connection portion 2 is located in FIG. 5), at this time, the connection portion 2 is located in the locking space 1*a*, and at this time, the electrical connection socket of the battery pack 3 and the electrical connection plug 41 on the bracket 4 are in a mutually pressing state, and the locking bolt 11 is switched to the second state position by gravity.

Figure 6:
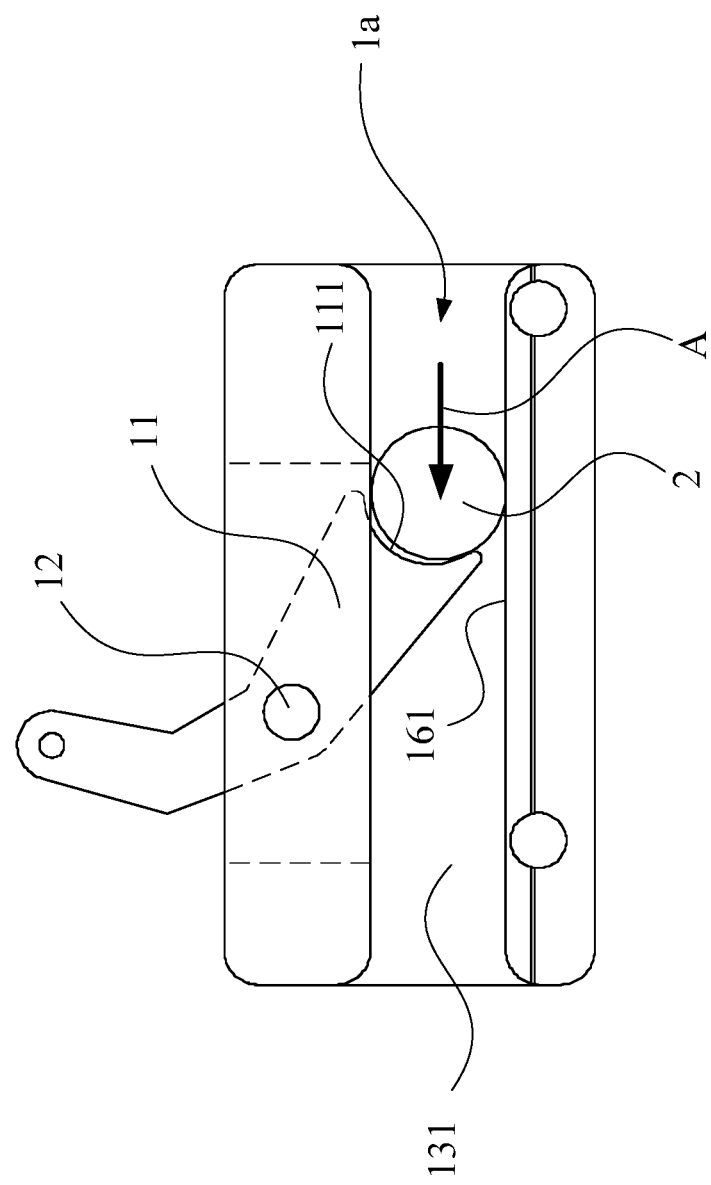
FIG. 6 is a flowchart (4) of the locking process of the locking mechanism in the embodiment 1 of the present invention.

After that, as shown in FIG. 6, after the external force pushing the battery pack 3 against the bracket 4 is removed, the pressing force between the battery pack 3 and the electrical connection plug 41 of the bracket 4 is released, and the connection portion 2 is displaced to the second locking position (that is, the position where the connection portion 2 is located in FIG. 6). At this time, the connection portion 2 abuts on the locking bolt 11 in the second state position along the horizontal direction A, so that the battery pack 3 is completely positioned on the bracket 4 along the first direction by the connection portion 2 abutting on the surface of the locking bolt 11, after the external force pushing the battery pack 3 into the bracket 4 is removed, so as to avoid the horizontal movement of the battery pack 3 in the bracket 4 and limit the displacement of the battery pack 3 relative to the bracket 4 in the horizontal direction A. At the same time, the displacement limiting scheme can also ensure that the bracket 4 and the battery pack 3 are always in an electrically connected state, thereby improve the reliability of the electrical connection. Wherein, in the embodiment, under the condition that the connecting portion 2 abuts on the locking bolt 11, the opening 1*b* is prevented from being opened because the connecting part 2 exerts a force on the locking bolt 11 by the arrangement position of the rotating shaft 12. In the embodiment, at the same time, the fixing portion also includes a limiting structure 161, as shown in FIG. 6, the limiting structure 161 is formed on the lower surface of the locking groove 131 to restrict the locking bolt 11 from turning further in the direction away from the second state position when it is in the first state position, so as to ensure that the locking bolt 11 effectively and reliably locks the connecting portion 2 in the locking space 1*a*.

At the same time, the locking bolt 11 in the embodiment is provided with an arc-shaped concave abutting surface 111 at its tail end 14*a*, wherein the abutting surface 111 is used to abut on the connecting portion 2, increase the contact area between the connecting portion 2 and the locking bolt 11 during the abutting process, so that the force exerted by the connecting portion 2 on the locking bolt 11 can be transmitted in the correct direction, and the stability of the locking or unlocking process is improved, and ensure that the locking bolt 11 can "self-lock" the connecting portion 2 in the locking space 1*a*.

In addition, as shown in FIGS. 3 to 5, one side surface of the locking groove 131 has a locking bolt groove 132 which is used to accommodate the locking bolt 11, and the locking bolt 11 is in the first state position when it is located in the locking bolt groove 132, so that the connecting portion 2 can enter the locking space 1*a* along the locking groove 131.

Figure 7:
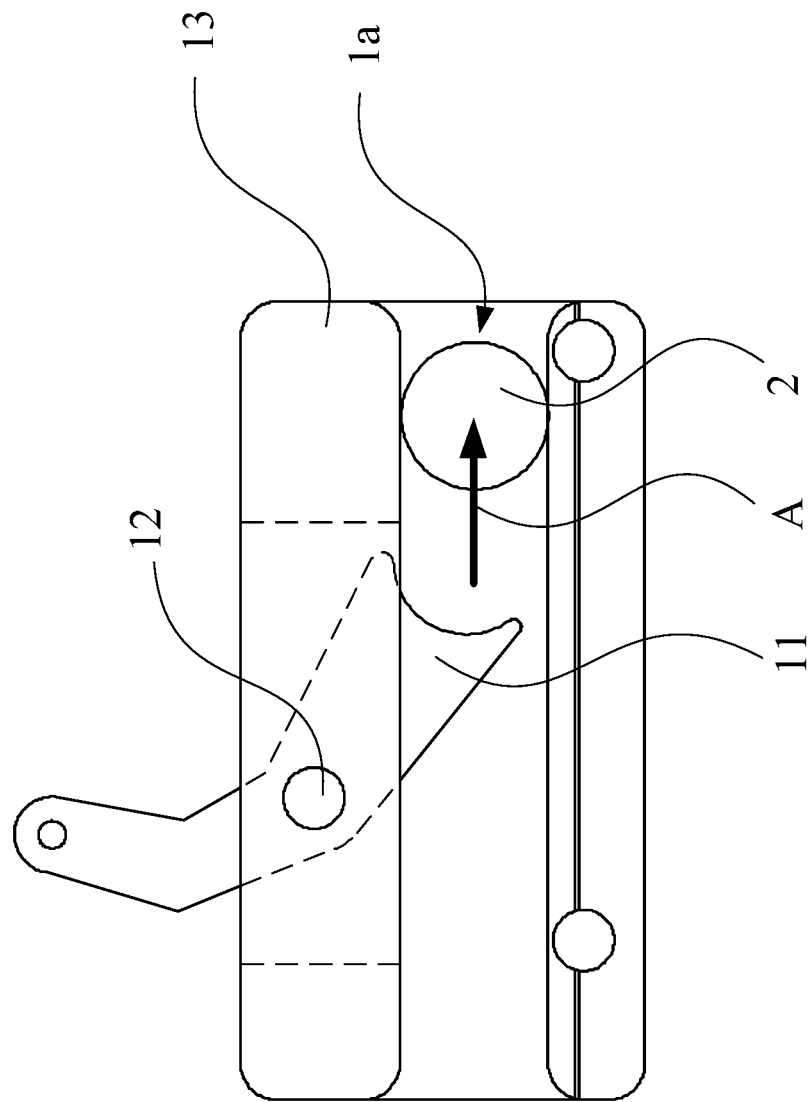
FIG. 7 is a flowchart (1) of the unlocking process of the locking mechanism in the embodiment 1 of the present invention.
Figure 8:
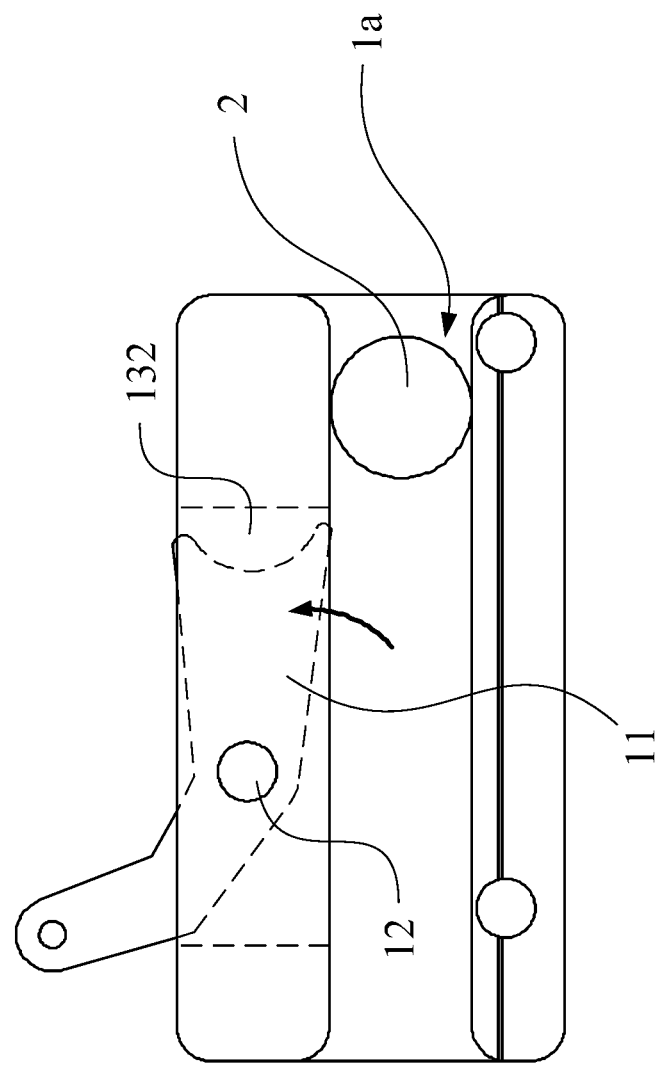
FIG. 8 is a flowchart (2) of the unlocking process of the locking mechanism in the embodiment 1 of the present invention.
Figure 9:
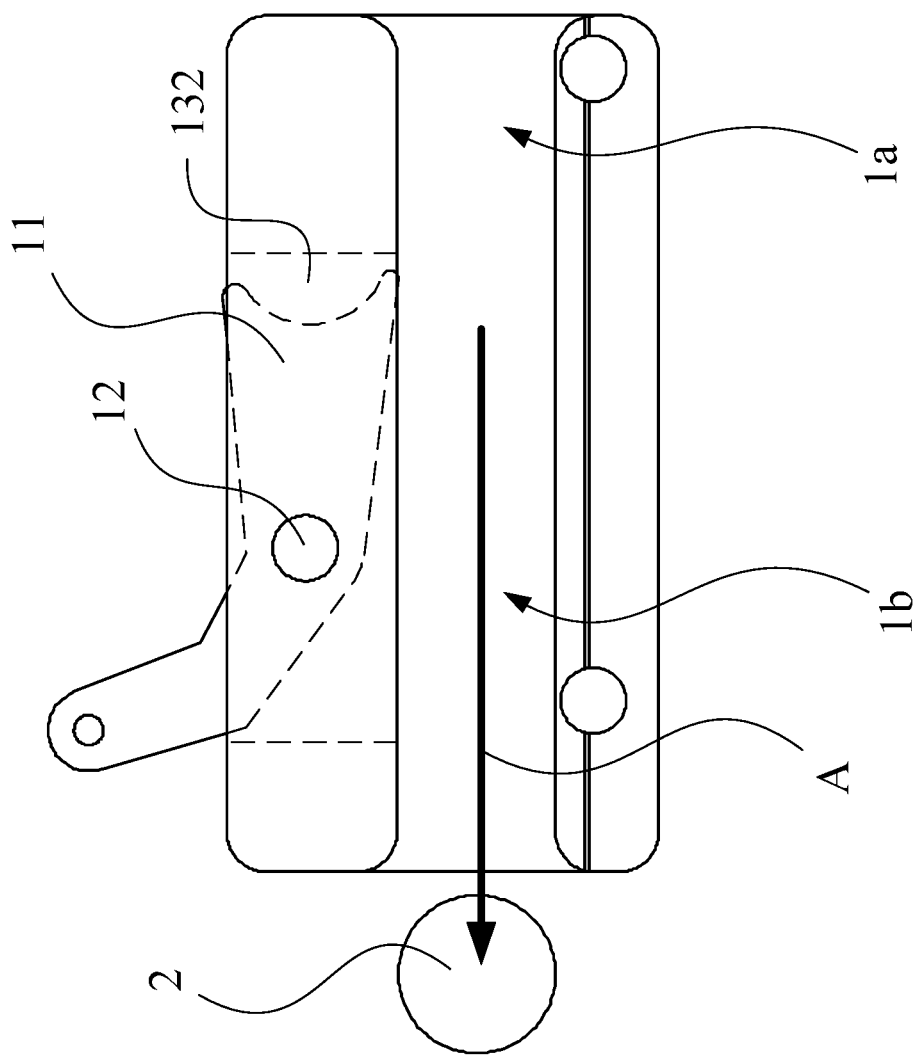
FIG. 9 is a flowchart (3) of the unlocking process of the locking mechanism in the embodiment 1 of the present invention.

As shown in FIGS. 7 to 9, there are flowcharts of the locking mechanism 10 unlocking the battery pack 3 on the bracket 4 in the embodiment. The unlocking process of the locking mechanism 10 is roughly the same as the above locking process. As shown in FIG. 7, when the battery pack 3 is locked in the bracket 4 and in the second locking position, the connection portion 2 abuts on the locking bolt 11.

As shown in FIG. 8, the external taking and placing mechanism of battery pack 3 pushes the battery pack 3 to the first locking position along the horizontal direction A, so that the locking bolt 11 has enough space to switch back to the first state position, so as to the opening 1*b* that moves the connection portion 2 out of the bracket 4 along the horizontal direction is opened. Wherein, the position of the locking bolt 11 is switched through the connecting portion 2 of the battery pack 3 itself to open the opening 1*b*, so that the battery pack 3 can enter the locking space 1*a* quickly and stably. Then, as shown in FIG. 9, the battery pack 3, under the action of the external taking and placing mechanism of battery pack 3, causes the connection part 2 to leave the locking space 1*a* from the opening 1*b*, thereby realizes unlocking the battery pack 3 from the bracket 4.

Wherein, in the unlocking process, the process of moving the locking bolt 11 from the second state position to the first state position cannot be realized by using the connecting portion 2 to push the locking bolt 11 to switch the state as in the locking process. Therefore, in the embodiment, the fixing portion further includes a connecting rod 14 and a driver, and the driver is indirectly connected to the locking bolt 11 through the connecting rod 14. Driven by the driver, the connecting rod 14 drives the locking bolt 11 to move from the second state position to the first state position, so that the connecting portion 2 can move out of the locking space 1a along the horizontal direction A during the unlocking process. The driver drives the locking bolt 11 to switch from the second state position to the first state position, which realizes the quick unlocking of the battery pack 3, and also improves the efficiency of automatic unlocking. Wherein, the driver can use the motion mechanism in the prior art to drive the locking bolt 11 to move. When the driver is a linear motion mechanism, the connecting rod 14 only serves as a connection to transmit linear displacement to the locking bolt 11; when the driver is a rotary motion mechanism, the connecting rod 14 also plays a role of changing the motion direction to change the rotary displacement into a linear displacement through a mechanical structure, such as a cam structure. Since the structures of these connecting rods 14 belong to the scope of the prior art, they will not be repeated here.

In addition, the present invention also provides a bracket assembly 20, wherein the bracket 4 on the bracket assembly 20 is used to receive a battery pack 3, and lock the battery pack 3 to the bracket 4 through a locking mechanism 10 provided on both sides of the bracket 4.

As shown in FIG. 1, the bracket assembly 20 includes the bracket 4 and the locking mechanism 10 as described above. Wherein, it has a plurality of locking mechanisms 10, and a plurality of the locking mechanisms 10 are arranged in sequence along the direction in which the battery pack 3 enters and exits relative to the bracket 4, so as to improve the fixing ability of the locking mechanism 10 to the battery pack 3. Preferably, these locking mechanisms 10 are distributed on both side surfaces of the battery pack 3, so as to set the locking mechanisms 10 by using the longitudinal space on both sides of the bracket 4, and make a reasonable layout.

Figure 10:
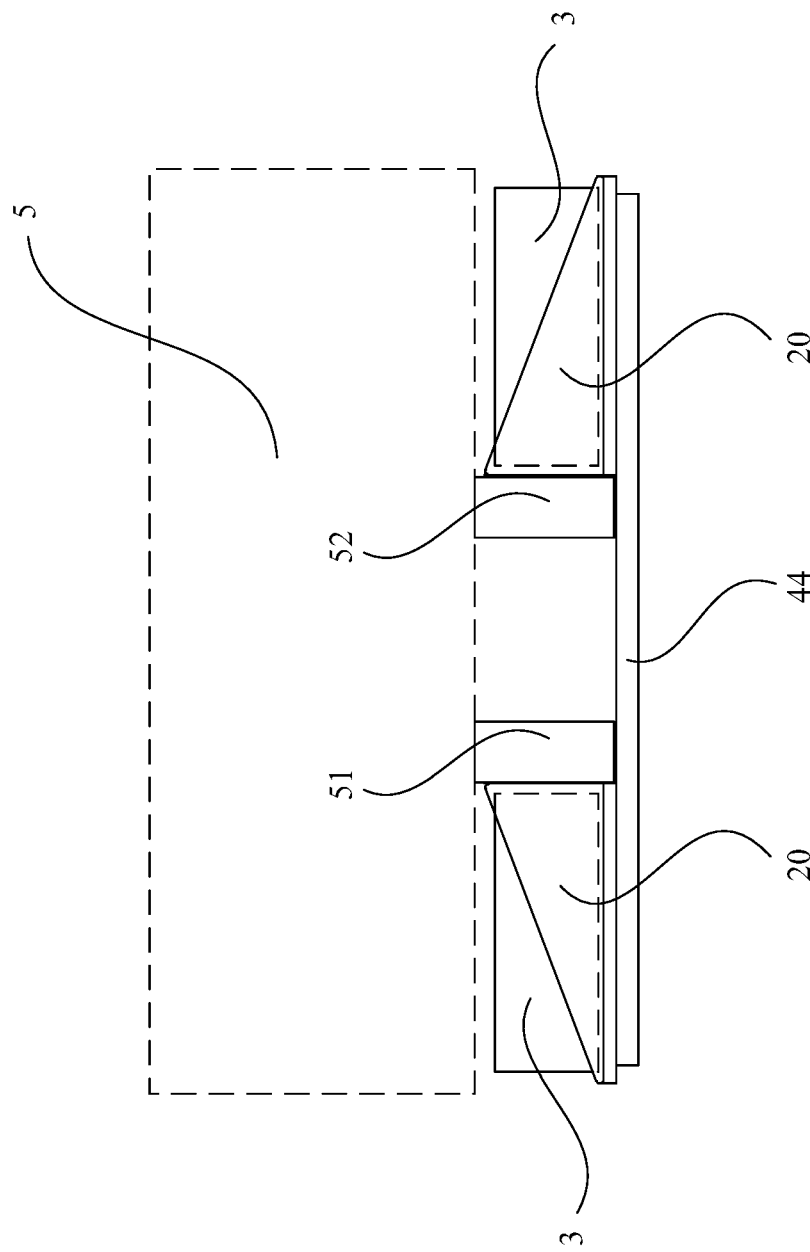
FIG. 10 is a schematic view of the connection relationship between the chassis of the electric vehicle and the bracket assembly in the embodiment 1 of the present invention.

The invention also provides an electric vehicle, which adopts the bracket assembly 20 as described above. As shown in FIG. 10, the lower part of the electric vehicle body 5 is provided with a chassis, which includes a left beam 51 and a right beam 52 arranged in parallel, wherein two bracket assemblies 20 are respectively arranged on the outside of the left beam 51 and the right beam 52, and the opening 1b is outward, so that the battery pack 3 can be installed on the lower part of the vehicle body from both sides. The bracket assembly 20 is fixed to the chassis through fasteners to ensure the stability of the bracket assembly 20 when it is installed on the electric vehicle and the vibration of the bracket assembly 20 when the electric vehicle is running can be avoided.

In addition, a bottom plate crossbeam of the bracket 4 of the bracket assembly 30 is integrally formed, and the bottom plate crossbeam is fixed to lower side surfaces of the left beam 51 and the right beam 52 to further improve the mounting stability of the bracket assembly 20.

The present invention also provides a battery pack locking method, which uses the battery pack 3 locking mechanism 10 as described above, and by moving the battery pack 3 into the opening 1b along the horizontal direction A, and then into the locking space 1a along the horizontal direction A, the battery pack 3 is locked on the bracket 4.

Embodiment 2

Figure 11:
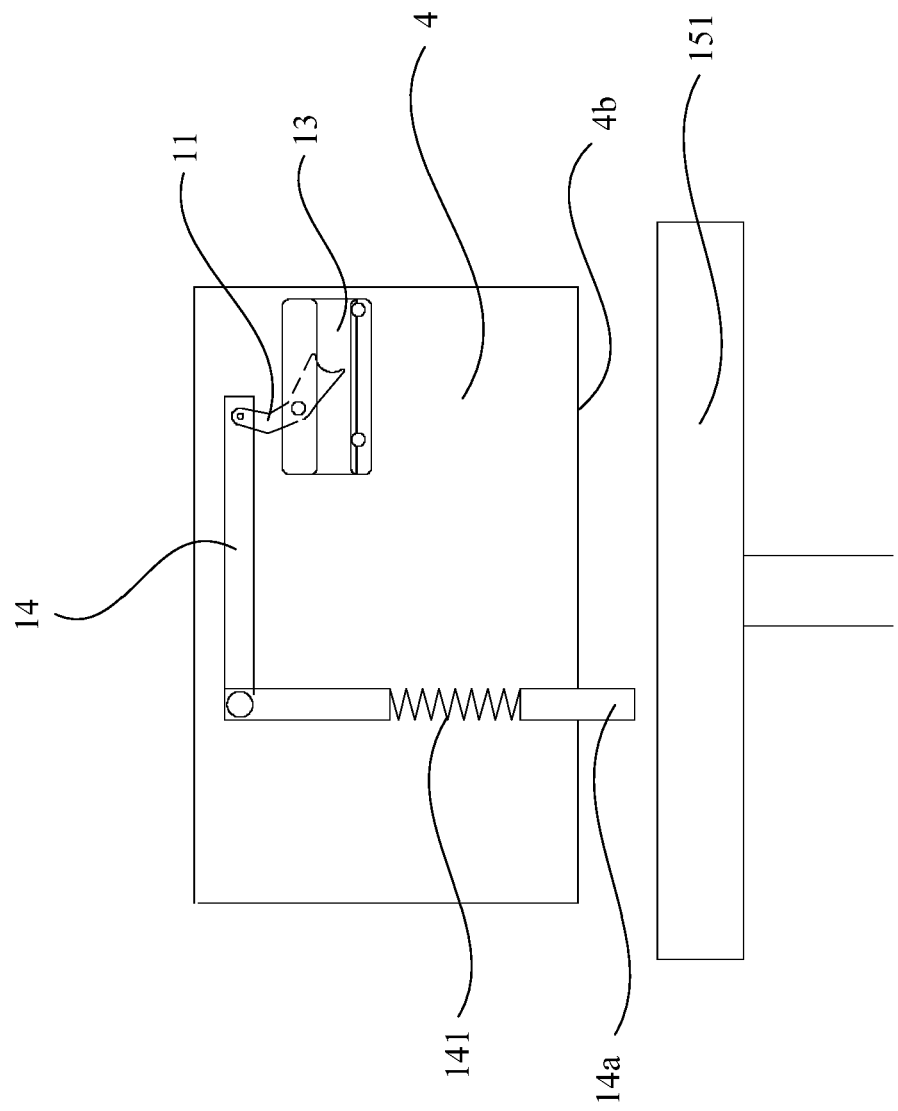
FIG. 11 is a schematic view (1) of the motion state of the connecting rod in the embodiment 2 of the present invention.

This embodiment also provides a locking mechanism 10, the structure of which is substantially the same as that of the locking mechanism 10 provided in embodiment 1, and except that in the embodiment, as shown in FIG. 11 and FIG. 12, they are schematic views of the movement of the connecting rod 14 in the embodiment. In the embodiment, a tail end 14a of the connecting rod 14 protrudes downward from the lower surface 4b of the bracket 4, and the driver is specifically a lift or a stacker, wherein the driver is located below the bracket 4, and a lifting platform 151 of the driver lifts up and pushes the tail end 14a of the connecting rod 14 to drive the locking bolt 11 to move from the second state position to the first state position. The locking mechanism 10 drives the locking bolt 11 to switch states by using a lift or a stacker as the driver, so that the existing battery swapping device can be used to both transfer and unlock the battery, so as to further simplify the complexity of the unlocking process of the locking mechanism 10 and improve the unlocking efficiency.

As shown in FIG. 12, after the lifting platform 151 pushes the tail end 14a of the connecting rod 14 upward, the lifting platform 151 continues to rise and contacts the lower surface 4b of the bracket 4 to further achieve the purpose of lifting the bracket 4 (and the electric vehicle connected to the bracket 4).

Wherein, in the existing unlocking process of battery pack 3, the lift or stacker lifts the bracket 4 and then removes the battery pack 3 from the bracket 4. Therefore, in this unlocking process sequence, when the lift or the stacker pushes the connecting rod 14 upward, the locking bolt 11 cannot be switched to the first state position since the connecting portion 2 also abuts on the locking bolt 11. Therefore, in the embodiment, the connecting rod 14 can be compressed along the transmission direction of the external force, so as to store the force of the lift or the stacker in the connecting rod 14 through compression, and release the displacement generated by compression when the connecting portion 2 is not in contact with the locking bolt 11, driving the locking bolt 11 to switch to the first state position to achieve the purpose of unlocking.

Concretely, in the embodiment, a part of the connecting rod 14 includes two sections, and the middle is adjacent to each other by a compression spring, so that the purpose of storing the force is achieved by providing a compression spring 141. Of course, in other embodiments, other methods in the prior art can also be used to achieve compression of the connecting rod 14 along the force direction, and the specific structure will not be repeated here.

In addition, in the embodiment, the structure of the connecting rod 14 shown in FIG. 11 and FIG. 12 is for illustrative purposes only.

The present invention also provides a battery pack locking method, which comprises the following steps:
1. move the battery pack 3 along the horizontal direction and control the connection portion 2 to enter the opening 1b. Concretely, the battery pack 3 can be moved closer to the bracket 4 along the horizontal direction A by the battery swapping device, and the locking bolt 11 can be pushed to the first state position by the connecting portion 2 to open the opening 1b, so that the connecting portion 2 can enter the opening 1b;

2. control the battery pack 3 to enter the locking space 1a along the horizontal direction A. Concretely, the battery pack 3 is moved along the horizontal direction A by the battery swapping device, so that the connecting portion 2 enters the first locking position in the locking space 1a;

3. control the locking mechanism 10 to close the opening 1b to lock the battery pack 3. Concretely, when the connecting portion 2 reaches the first locking position, the locking bolt 11 rotates downward to the second state position under its own gravity or external force to close the opening.

4. Control the connection portion 2 of the battery pack 3 to abut on the locking bolt 11, that is, the connection portion 2 moves to the second locking position. Concretely, when the locking bolt 11 closes the opening 1b, remove the force exerted by the battery swapping device on the battery pack 3, and the battery pack 3 moves horizontally and reversely under the compression force of the electrical connection plug of the bracket 4, so that the connection portion 2 moves to the second locking position.

By locking the battery pack 3 on the bracket 4 through the above process, the complexity of the process and the cumbersome steps of mounting and fixing the battery pack 3 on the bracket 4 can be effectively reduced, and the reliability and firmness of the bracket 4 locking the battery pack 3 can be ensured.

Although the specific embodiments of the present invention are described above, it should be understood by those skilled in the art that this is only an example, and the scope of protection of the present invention is defined by the appended claims. Those skilled in the art can make various changes or modifications to these embodiments without departing from the principles and essence of the present invention, but these changes and modifications fall into the scope of protection of the present invention.

The invention claimed is:

1. A battery pack locking mechanism, wherein the battery pack locking mechanism is provided on a side wall of a bracket, wherein the locking mechanism is used for unlocking or locking a battery pack on the bracket and comprising a fixing portion which has a locking space, and when the battery pack is placed relative to the bracket, the locking mechanism is used for locking a connecting portion on the battery pack in the locking space;

on one side of the locking space, the locking mechanism is provided with an opening facing towards the battery pack and entering the bracket along the horizontal direction, so that the connecting portion is able to enter the opening along the horizontal direction and continue to move along the horizontal direction to move into the locking space.

2. The battery pack locking mechanism as claimed in claim 1, wherein the locking mechanism further comprises a locking bolt, which is used to lock the connecting portion to prevent the connecting portion from leaving the locking space after the connecting portion on the battery pack enters the locking space.

3. The battery pack locking mechanism as claimed in claim 2, wherein the locking bolt is rotatably arranged on the bracket to open or close the opening, and the locking bolt is able to be switched between a first state position and a second state position;

when the locking bolt is in the first state position, the locking bolt is able to open the opening, and the connecting portion is able to enter or leave the locking space;

when the locking bolt is in the second state position, the locking bolt is able to close the opening, and the connecting portion is not able to enter or leave the locking space.

4. The battery pack locking mechanism as claimed in claim 1, wherein when the battery pack is locked relative to the bracket, the locking mechanism applies a vertical support force and a horizontal abutting force to the battery pack.

5. The battery pack locking mechanism as claimed in claim 3, wherein the fixing portion comprises a locking body, and one side of the locking body has a locking groove concave to the inside of the locking body, wherein the locking space is formed in the locking groove, and the locking groove forms the opening on the surface of the locking body, and the opening is used for allowing the connecting portion to enter and exit the locking space along the direction of the battery pack being electrically inserted and unplugged relative to the bracket;

or, when the battery pack enters the bracket, the locking bolt rotates toward the direction close to a surface of the bracket where the electrical connection plug is arranged;

when the battery pack reaches the locking space, the locking bolt rotates in a direction away from an electrically inserted and unplugged surface of the bracket;

or the fixing portion further comprises a driver which is connected to the locking bolt, the driver is used to drive the locking bolt to switch from the second state position to the first state position, so as to unlock the battery pack.

6. The battery pack locking mechanism as claimed in claim 5, wherein the locking bolt is in the second state position when it is located at the opening of the locking groove, and the connecting portion is able to push the locking bolt to move from the second state position to the first state position.

7. The battery pack locking mechanism as claimed in claim 6, wherein the fixing portion further comprises a limiting member, which is used to limit the locking bolt from moving away from the second state position when the locking bolt is in the first state position;

when the battery pack is electrically plug-in the bracket, the locking bolt is located at the second state position, and the connecting portion abuts on the surface of the locking bolt in a direction that pushes the locking bolt away from the second state position.

8. The battery pack locking mechanism as claimed in claim 5, wherein one side surface of the locking groove has a locking bolt groove which is used to accommodate the locking bolt, and the locking bolt is in the first state position when it is located in the locking bolt groove.

9. The battery pack locking mechanism as claimed in claim 3, wherein the fixing portion further comprises an elastomer, which is used to apply an elastic force to the locking bolt to keep the locking bolt in the second state position when it is not affected by an external force.

10. The battery pack locking mechanism as claimed in claim 3, wherein the fixing portion further comprises a connecting rod, which is movably connected to the locking bolt, and the connecting rod drives the locking bolt to move from the second state position to the first state position under the action of an external force.

11. The battery pack locking mechanism as claimed in claim 10, wherein the connecting rod is able to be compressed along the transmission direction of the external force.

12. The battery pack locking mechanism as claimed in claim 5, wherein the movable mode of the locking bolt relative to the bracket is a turning activity, and the locking bolt switches between the first state position and the second state position by the turning activity.

13. The battery pack locking mechanism as claimed in claim 3, wherein the locking bolt is provided on the bracket by means of a rotating shaft, the rotating shaft is provided on the bracket above the locking space, and the rotating shaft is arranged such that when the connecting portion is located in the locking space, the horizontal distance between the axis of the rotating shaft and a front surface of the battery pack is greater than the horizontal distance between the center of the connecting portion and the front surface of the battery pack.

14. A battery pack locking assembly, wherein the battery pack locking mechanism is used for unlocking or locking a battery pack on a bracket, wherein the locking mechanism comprising a fixing portion respectively provided on a side wall of the bracket and a connecting portion provided at a corresponding position of the battery pack, and the fixing portion has a locking space, wherein the locking mechanism is used to lock the connecting portion in the locking space when the battery pack is placed relative to the bracket;

on one side of the locking space, the locking mechanism is provided with an opening facing towards the battery pack and entering the bracket along the horizontal direction, so that the connecting portion is able to enter the opening along the horizontal direction and continue to move along the horizontal direction to move into the locking space.

15. The battery pack locking assembly as claimed in claim 14, wherein the fixing portion comprises a locking body, and one side of the locking body has a locking groove concave to the inside of the locking body, wherein the locking space is formed in the locking groove, and the locking groove forms the opening on the surface of the locking body, and the opening is used for allowing the connecting portion to enter and exit the locking space along the direction of the battery pack being electrically inserted and unplugged relative to the bracket.

16. A bracket assembly, wherein the bracket assembly includes a bracket and the battery pack locking mechanism as claimed in claim 1.

17. The bracket assembly as claimed in claim 16, wherein, it has a plurality of locking mechanisms, and a plurality of the locking mechanisms are arranged in sequence along the direction in which the battery pack enters and exits relative to the bracket;

or the bracket is fixed to a surface of a chassis beam of an electric vehicle through fasteners.

18. An electric vehicle, wherein electric vehicle includes the bracket assembly as claimed in claim 16.

19. The electric vehicle as claimed in claim 18, wherein the bracket of the bracket assembly is fixed to the surface of the chassis beam of the electric vehicle through fasteners.

20. A battery pack locking method, wherein the battery pack locking method uses the battery pack locking mechanism as claimed in claim 1, which comprises the following steps:

move the battery pack along the horizontal direction and control the connection portion to enter the opening;

control the battery pack to enter the locking space along the horizontal direction;

control the locking mechanism to close the opening to lock the battery pack.

21. The battery pack locking method as claimed in claim 20, wherein the locking mechanism further comprises a locking bolt, which is used to lock the connecting portion to prevent the connecting portion from leaving the locking space after the connecting portion on the battery pack enters the locking space;

the battery pack locking method further includes the following step after controlling the locking mechanism to close the opening to lock the battery pack:

control the connection portion to abut on the locking bolt.

* * * * *